(12) United States Patent
Niazi

(10) Patent No.: US 11,743,591 B2
(45) Date of Patent: *Aug. 29, 2023

(54) IMAGING SYSTEM, METHOD, AND APPLICATIONS

(71) Applicant: Circle Optics, Inc., Rochester, NY (US)

(72) Inventor: Zakariya Niazi, Long Island City, NY (US)

(73) Assignee: Circle Optics, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,964

(22) Filed: May 12, 2022

(65) Prior Publication Data

US 2022/0272261 A1  Aug. 25, 2022

Related U.S. Application Data

(63) Continuation of application No. 16/845,721, filed on Apr. 10, 2020, now Pat. No. 11,363,194, which is a
(Continued)

(51) Int. Cl.
*H04N 23/698* (2023.01)
*G02B 13/06* (2006.01)
(Continued)

(52) U.S. Cl.
CPC .......... *H04N 23/698* (2023.01); *G02B 13/06* (2013.01); *G03B 37/04* (2013.01); *H04N 23/90* (2023.01)

(58) Field of Classification Search
CPC ............ H04N 5/2254; H04N 5/23238; H04N 5/247; H04N 5/2258; H04N 5/2259;
(Continued)

(56) References Cited

U.S. PATENT DOCUMENTS

| 2,696,758 | A | 12/1954 | Angenieux |
| 5,023,725 | A | 6/1991 | McCutchen |
| 5,130,794 | A | 7/1992 | Ritchey |
| 5,703,604 | A | 12/1997 | McCutchen |

(Continued)

FOREIGN PATENT DOCUMENTS

| AU | 2009210672 | 8/2009 |
| CN | 1745337 A | 3/2006 |

(Continued)

OTHER PUBLICATIONS

Patent Search Report dated Dec. 14, 2018 from Federal Service for Intellectual Property (ROSPATENT) Federal Institute of Industrial Property, in corresponding Russia Patent Application No. 2016145439/28(073015).

(Continued)

*Primary Examiner* — Nathnael Aynalem
(74) *Attorney, Agent, or Firm* — Ostrager Chong Flaherty & Broitman P.C.

(57) ABSTRACT

A multicamera panoramic imaging system having no parallax. In an example, the multicamera panoramic imaging system includes multiple discrete, imaging systems disposed in a side-by-side array, wherein a field of view of each discrete, imaging systems is conjoined with a field of view of each adjacent discrete imaging system, further wherein a stencil of chief rays at the edge of the field of view of any one of the discrete imaging systems will be substantially parallel to a stencil of chief rays at the edge of the field of view of any adjacent ones of the discrete imaging systems such that all of the substantially parallel stencils of chief rays appear to converge to a common point when viewed from object space. A method for forming an image of an object having no parallax.

21 Claims, 20 Drawing Sheets

Related U.S. Application Data continuation of application No. 16/420,752, filed on May 23, 2019, now Pat. No. 10,659,688, which is a continuation of application No. 15/309,180, filed as application No. PCT/US2015/029146 on May 5, 2015, now Pat. No. 10,341,559.

(60) Provisional application No. 61/989,136, filed on May 6, 2014.

(51) Int. Cl.
    *G03B 37/04* (2021.01)
    *H04N 23/90* (2023.01)

(58) Field of Classification Search
    CPC ...... H04N 23/698; H04N 23/90; G02B 13/06; G02B 13/16; G02B 17/0804; G02B 17/0856; G02B 27/0172; G02B 2027/0123; G02B 27/0018; G02B 27/1066; G03B 37/04; G01C 11/02
    USPC .............................. 348/36, 95, 262, 335, 374
    See application file for complete search history.

(56) References Cited

U.S. PATENT DOCUMENTS

| | | | |
|---|---|---|---|
| 6,141,034 | A | 10/2000 | McCutchen |
| 6,549,650 | B1 | 4/2003 | Ishikawa et al. |
| 6,618,093 | B1 | 9/2003 | Levy |
| 6,870,680 | B2 | 3/2005 | Yoshikawa et al. |
| 7,006,123 | B2 | 2/2006 | Yoshikawa et al. |
| 7,015,954 | B1 | 3/2006 | Foote et al. |
| 7,119,961 | B2 | 10/2006 | Yoshikawa et al. |
| 7,126,756 | B2 | 10/2006 | Yoshikawa et al. |
| 7,268,805 | B2 | 9/2007 | Yoshikawa et al. |
| 7,277,118 | B2 | 10/2007 | Foote |
| 7,440,637 | B2 | 10/2008 | Schechner et al. |
| 7,515,177 | B2 | 4/2009 | Yoshikawa |
| 7,548,373 | B2 | 6/2009 | Yoshikawa et al. |
| 7,620,909 | B2 | 11/2009 | Park et al. |
| 7,664,340 | B2 | 2/2010 | Yoshikawa |
| 7,710,463 | B2 | 5/2010 | Foote |
| 7,782,357 | B2 | 8/2010 | Cutler |
| 7,817,354 | B2 | 10/2010 | Wilson |
| 7,834,910 | B2 | 11/2010 | DeLorme et al. |
| 9,503,638 | B1 | 11/2016 | Nguyen et al. |
| 2004/0051805 | A1* | 3/2004 | Yoshikawa .......... H04N 23/698 348/335 |
| 2006/0114332 | A1 | 6/2006 | Yoshikawa |
| 2007/0091195 | A1* | 4/2007 | Yoshikawa ............ G02B 13/16 348/335 |
| 2007/0182812 | A1 | 8/2007 | Ritchey |
| 2011/0069189 | A1 | 3/2011 | Venkataraman et al. |
| 2011/0080487 | A1 | 4/2011 | Venkataraman et al. |
| 2011/0304612 | A1 | 12/2011 | Ohyama |
| 2013/0076900 | A1 | 3/2013 | Mrozek |
| 2014/0146132 | A1 | 5/2014 | Bagnato et al. |

FOREIGN PATENT DOCUMENTS

| | | |
|---|---|---|
| EP | 1593999 A1 | 11/2005 |
| JP | 2003162018 A | 6/2003 |
| JP | 2004184862 A | 7/2004 |
| JP | 2007110228 A | 4/2007 |
| RU | 2399073 C1 | 10/2010 |
| WO | 2007046498 A1 | 4/2007 |
| WO | 2012066642 A1 | 5/2012 |
| WO | 2013154433 A1 | 10/2013 |

OTHER PUBLICATIONS

Office Action (Enquiry) dated Dec. 21, 2018 from Patent Office of Russian Federation, Federal Institute of Industrial Property, in corresponding Russia Patent Application No. 2016145439/28(073015).

Zhang, Cha et al., "A Survey on Image-Based Rendering," Electrical and Computer Engineering, Carnegie Mellon University, Jun. 2003, Pittsburgh, PA.

Qi, Zhi et al., "Overcoming Parallax and Sampling Density Issues in Image Mosaicing of Non-Planar Scenes," Centre for Intelligent Machines, McGill University.

McCutchen, David, "A Dodecahedral Approach to Immersive Imagine and Display," Computer Graphics, May 1997, pp. 35-37.

Peleg, Shmuel et al., "Panoramic Mosaics by Manifold Projection," Proc. of Int'l Conf. on Computer Vision and Pattern Recognation, 1997: 338-343, San Juan, Puerto Rico.

Qi Zhi, Towards Dynamic Mosaic Generation with Robustness to Parallax Effects, Department of Electrical Engineering, McGill University, Montreal, Quebec, 2008.

Shum, Heung-Yeung et al., "Construction and Refinement of Panoramic Mosaics with Global and Local Alignment," Sixth International Conference on Computer Vision (IEEE Cat. No. 98CH36271), Jan. 7, 1998, Bombay, India.

Wilburn, Bennett et al., "High Performance Imaging Using Large Camera Arrays," Association of Computing Machinery, Inc., U.S., 2005.

Moore, Dustin, "Where is the Minimum Parallax Point?", 2012, United States.

Icosahedron, http://en.wikipedia.org/wiki/Icosahedron, May 4, 2012.

Examination report dated Nov. 17, 2021 from Canadian Intellectual Property Office, Appl. No. 2,953,337 (PCT No. US2015029146).

Examination report dated Sep. 16, 2019 from China National Intellectual Property Administration, Appl. No 201580034186.5.

Notice of Grant dated Jan. 13, 2021 from China National Intellectual Property Administration, Appl. No 201580034186.5.

Examination report dated Jul. 12, 2021 from China National Intellectual Property Administration, Appl. No 202010190853.1 (divisional of Appl. No. 201580034186.5).

Examination report dated Jul. 9, 2018 from European Patent Office, Appl. No. 15 723 390.9.

Examination report dated Nov. 27, 2019 from European Patent Office, Appl. No. 15 723 390.9.

Examination report dated Jul. 15, 2020 from European Patent Office, Appl. No. 15 723 390.9.

Intention to Grant dated Jun. 3, 2021 from European Patent Office, Appl. No. 15 723 390.9.

Search Opinion dated Jun. 21, 2021 from European Patent Office, Appl. No. 21162087.7 (continuation of Appl No. 15 723 390.9).

Examination report dated Jan. 7, 2020 from Intellectual Property India, Appl. No. 201617041154.

Decision of Refusal dated Feb. 25, 2020 from Japanese Patent Office, Appl. No. 2017-511155.

Notice of Reasons for Refusal dated Jan. 28, 2021 from Japanese Patent Office, Appl. No. 2017-511155.

Trial and Appeal Decision dated Jul. 12, 2021 from Japanese Patent Office, Appl. No. 2017-511155.

Notice of Reasons for Refusal dated Jun. 24, 2021 from Japanese Patent Office, Appl. No. 2020-109314 (continuation of Appl. No. 2017-511155).

Decision of Refusal dated Jan. 11, 2022 from Japanese Patent Office, Appl. No. 2020-109314 (continuation of Appl. No. 2017-511155).

Notice of Non-Final Rejection dated Dec. 18, 2018 from Korean Intellectual Property Office, Appl. No. 10-2016-7032965.

Notice of Allowance of Patent dated Nov. 4, 2019 from Korean Intellectual Property Office, Appl. No. 10-2016-7032965.

Notice of Non-Final Rejection dated Jul. 28, 2020 from Korean Intellectual Property Office, Appl. No. 10-2020-7002743 (divisional of Appl. No. 10-2016-7032965).

Notice of Allowance dated Jan. 25, 2021 from Korean Intellectual Property Office, Appl. No. 10-2020-7002743 (divisional of Appl. No 10-2016-7032965).

Notification of Reasons for Refusal in corresponding Japanese Patent Application No. 2017-511155, dated Mar. 19, 2019.

(56) References Cited

OTHER PUBLICATIONS

International Search Report in PCT/US2015/029146 dated Jul. 14, 2015.
Written Opinion of the International Searching Authority in PCT/US2015/029146 dated Nov. 12, 2015.
Written Opinion from Intellectual Property Office of Singapore in corresponding Application No. 11201609780P, dated Sep. 7, 2017.
Moore, Dustin, "Where Is The Minimum Parallax Point?" Apr. 21, 2012.
Notice of Eligibility of Grant from Intellectual Property Office of Singapore in corresponding Application No. 11201609780P, dated Jun. 21, 2018.

* cited by examiner

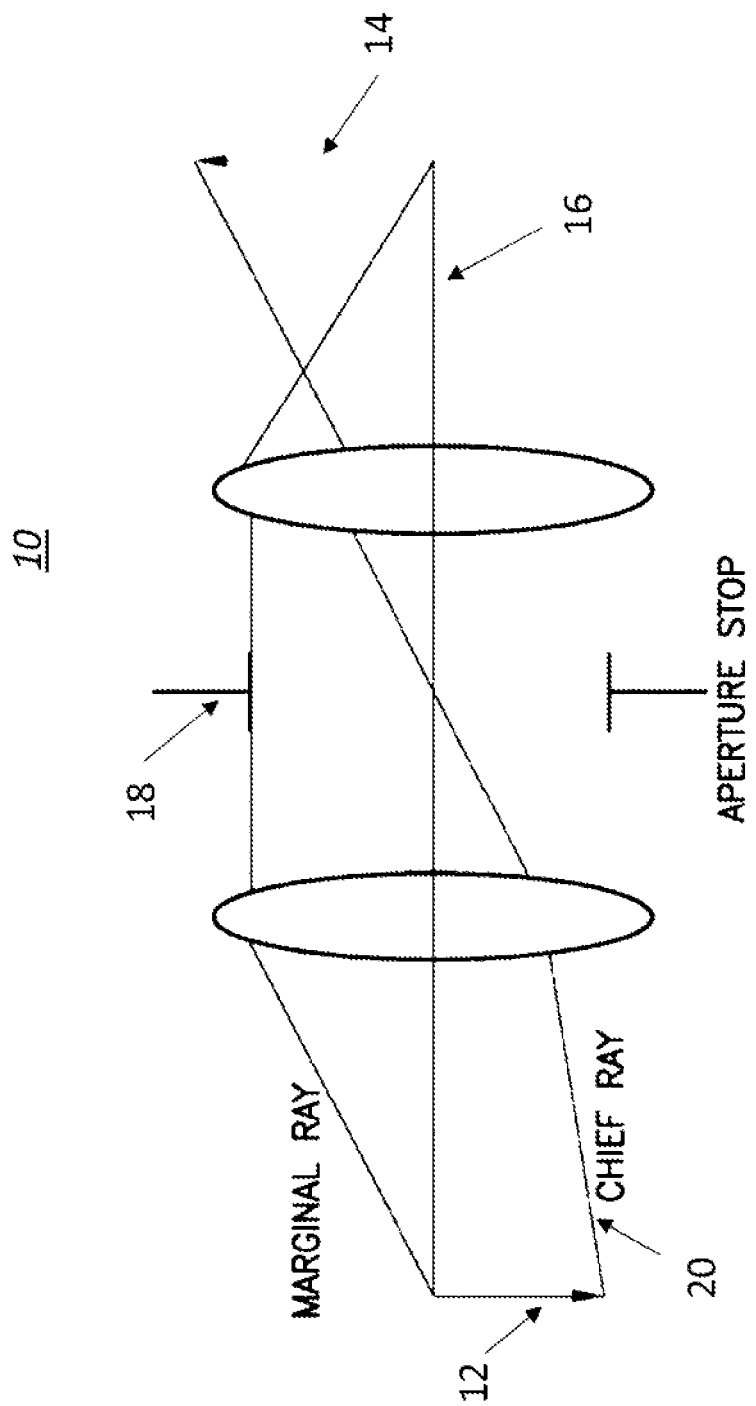

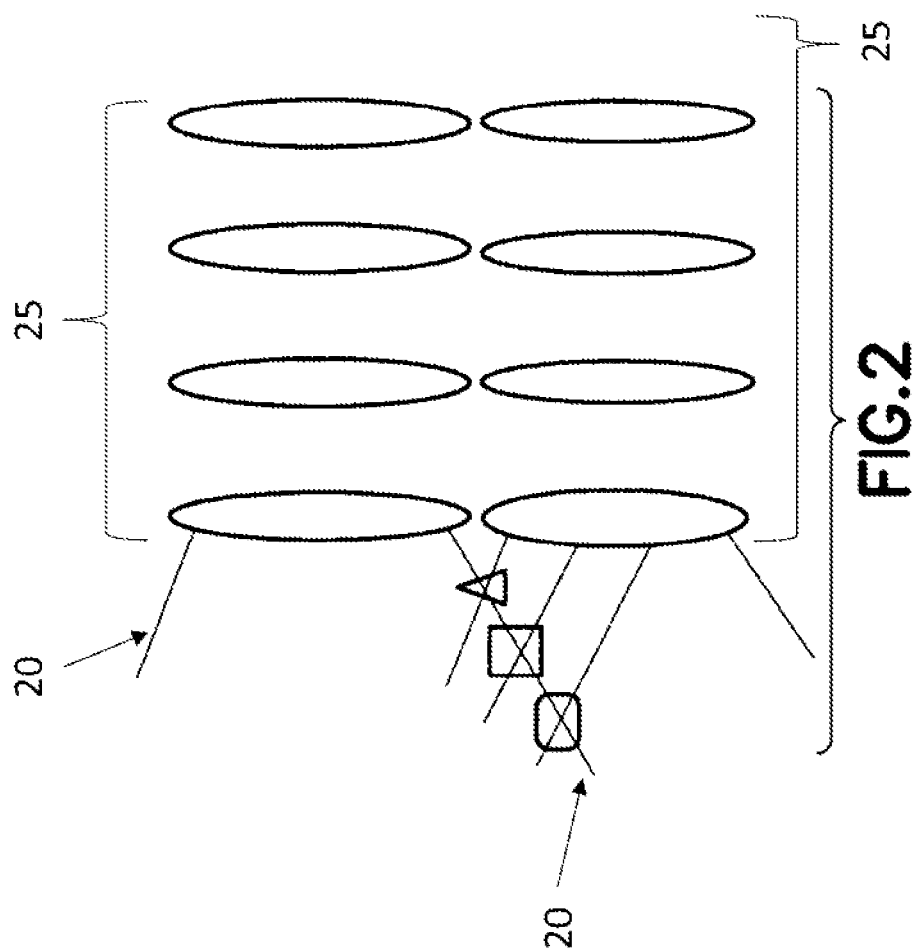

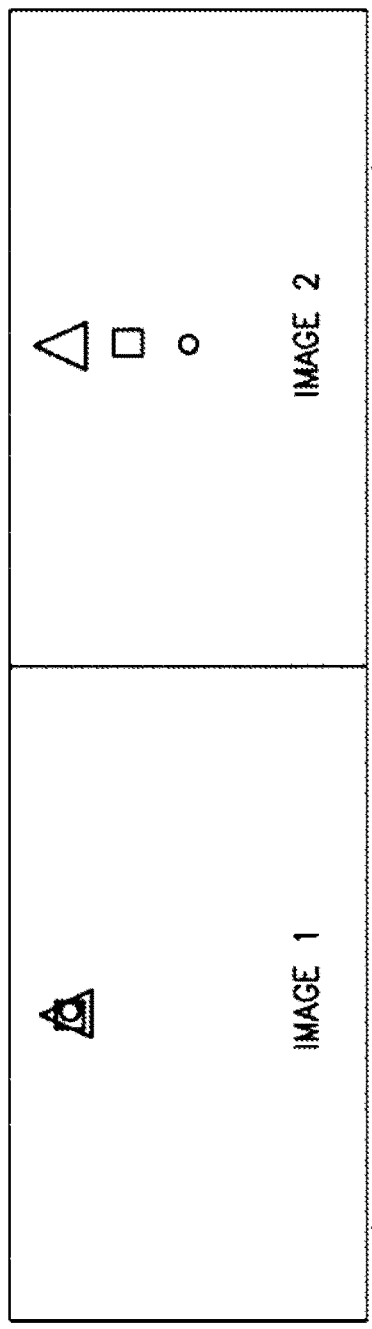
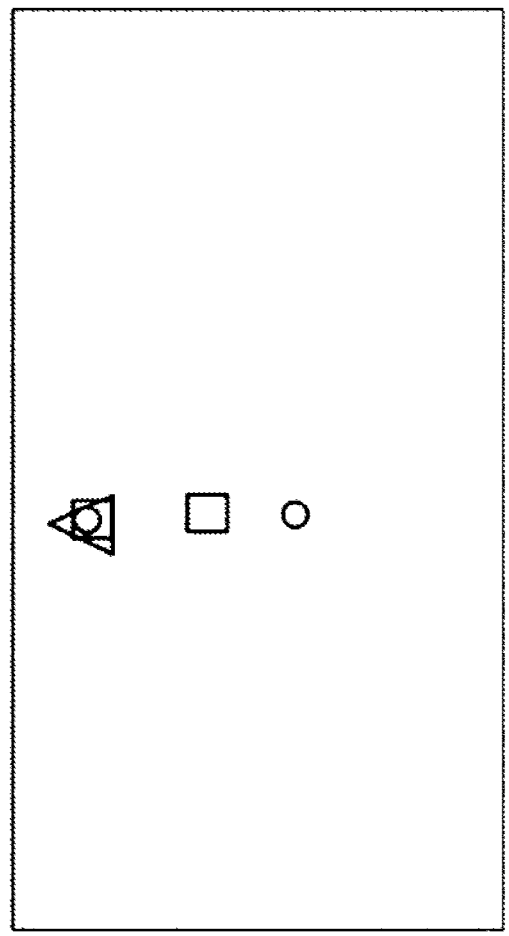

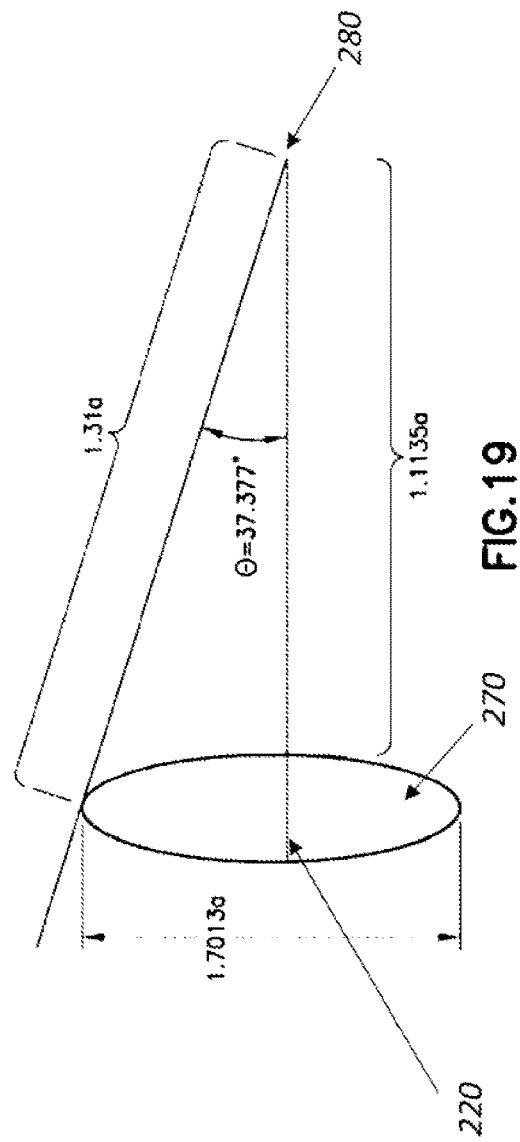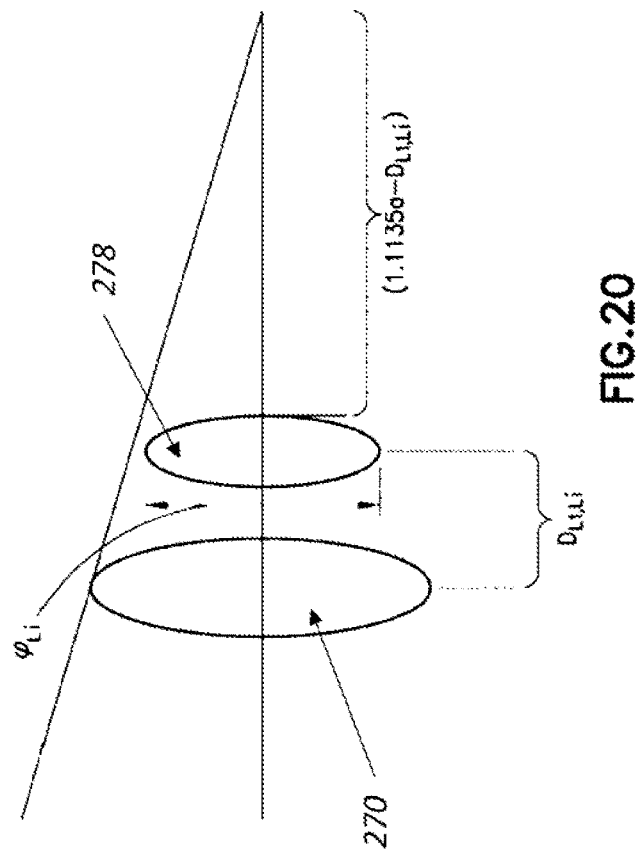

IMAGING SYSTEM, METHOD, AND APPLICATIONS

RELATED APPLICATION DATA

The instant application is a continuation application of U.S. application Ser. No. 16/845,721, which is a continuation application of U.S. application Ser. No. 16/420,752, now U.S. Pat. No. 10,659,688, which is a continuation application of U.S. application Ser. No. 15/309,180, now U.S. Pat. No. 10,341,559 B2, which is a 371 of international application No. PCT/US2015/029146, which claims the benefit of U.S. provisional application No. 61/989,136 filed May 6, 2014, the subject matter of which is incorporated herein by reference in its entirety.

BACKGROUND

Field of the Invention

Aspects and embodiments of the invention are most generally directed to an optical imaging system, methods pertaining thereto, and applications thereof; more particularly to a panoramic optical imaging system, methods pertaining thereto, and applications thereof; and, most particularly to a panoramic optical imaging system that has zero or substantially no parallax, methods pertaining thereto, and applications thereof.

Description of Related Art

Current 360 degree systems without parallax employ an arrangement of mirrors to scan the image and are limited by an imaging speed of 10 frames per second (fps). Google uses a 360 degree camera with refractive lenses developed by Immersive Media to capture photos for its Streetview software. The photos must be post-processed and corrected for parallax, costing time, which reduces Google's ability to scale its Streetview initiatives. Fisheye lenses provide wide angle imaging but at the cost of high distortion. Distortion is the physical result of mapping a large spherical object onto a small flat image plane.

Some companies have developed optical systems to simplify the process of taking a panoramic image. Rather than rotating the camera to get multiple shots, all of the photos are captured simultaneously with many cameras imaging different parts of the scene. Immersive Media and Greypoint Imaging have developed single shot 360 degree cameras that are available for varying price tags between $10,000 and $100,000. Both companies develop software to automatically correct for the artifacts (parallax) created in the image and offer a better solution than panoramas captured by one camera, e.g., the iPhone camera. The software, however, is not perfect and many artifacts still exist in the images. Anecdotally, Google, had one person carry a Dodeca 360 camera (offered by Immersive Media) around the Grand Canyon, and had to employ programmers to correct the images frame by frame for the artifacts induced by parallax.

Parallax and the Chief Rays of an Optical System

Parallax is defined as "the effect whereby the position or direction of an object appears to differ when viewed from different positions, e.g., through the viewfinder and the lens of a camera." Parallax is created as a result of stitching together images from multiple cameras, each with its own unique perspective of the world.

Referring to FIG. 1, the chief ray 20 of an optical system 10 is the meridional ray that starts at the edge of an object 12, crosses the center of the optical axis 16 at the aperture stop 18, and ends at the edge of the image 14 at the detector. Thus, the chief ray defines the size of an image.

The chief ray plays a critical role in the parallax created by stitching together multiple images. FIG. 2 illustrates two optical systems (cameras) 25 side by side. For the lens unit on top, the square, triangle, and rectangle are mapped to the same point in the image, whereas for the lens unit on bottom they are mapped to three distinct points as shown. In the top imaging system 25, they are imaged by the same chief ray 20, whereas for the bottom imaging system, they are imaged by three distinct chief rays. When combining the two images 14 in FIG. 3, parallax would occur and an image 14 as shown in FIG. 4 would result.

The search for an algorithm that can correct for parallax has been going on for many years. Many solutions have been developed but even with the most sophisticated algorithms to date, artifacts are still left in panoramic images. For some, this may not be a problem as software engineers can be hired to fix the images frame by frame; however, for the general consumer this option of correcting each image is not feasible. A better solution is needed that effectively corrects for parallax before such a system can be made available to the consumer market. It is preferable to solve the problem of reducing parallax in an image optically, rather than computationally.

Current designs created for single shot panoramic imaging suffer from parallax because they are created from imaging systems with overlapping fields of view. FIG. 5 is taken from U.S. Pat. No. 2,696,758. This figure illustrates how parallax is created in the 360 degree imaging systems 50 available today. The field of views 28 overlap and a triangle that appears at the edge of the FOV 28 for the bottom lens system will appear at around 0.707 times the FOV 28 in the imaging system on top. Thus, the triangle is mapped to different image points for each camera 25. On the bottom it is mapped to the full FOV 28 (the edge of the image).

The inventor has thus recognized the advantages and benefits of a panoramic imaging system and associated methods in which there is no parallax, and where the parallax is eliminated optically rather than by post-processing software. Such a system would have applications including providing a scalable way to map the streets of the planet; allowing for the creation of virtual tours, both of cities and of private institutions; high frame-rate video surveillance; military applications including drone and tank technology; an alternative for fisheye lenses which provide wide angle imaging at the cost of high distortion.

BRIEF DESCRIPTION OF THE FIGURES

FIG. 1 illustrates the chief ray of an optical system. The chief ray defines the height of the object as well as the height of the image.

FIG. 2 illustrates why parallax occurs when multiple refractive imaging systems are used to capture an image of a scene. In the lens unit on top, the three objects are mapped to the same image point; in the bottom lens unit they are mapped to three separate image points.

FIG. 3 (left) illustrates the image formed by the top lens unit in FIG. 2, whereas the image on the right is that formed by the bottom lens unit.

FIG. 4 shows the image that would result from combining the two images in FIG. 3.

FIG. 19: Diagram illustrating the constraints imposed on the first lens element with respect to the center of the dodecahedron. "a" is the side length of each regular pentagon in the dodecahedron.

FIG. 20: Diagram illustrating that the maximal length of any element is constrained to fit within the 31.717 degree half angle cone of light emanating from the center of the dodecahedron.

SUMMARY

Figure 5:
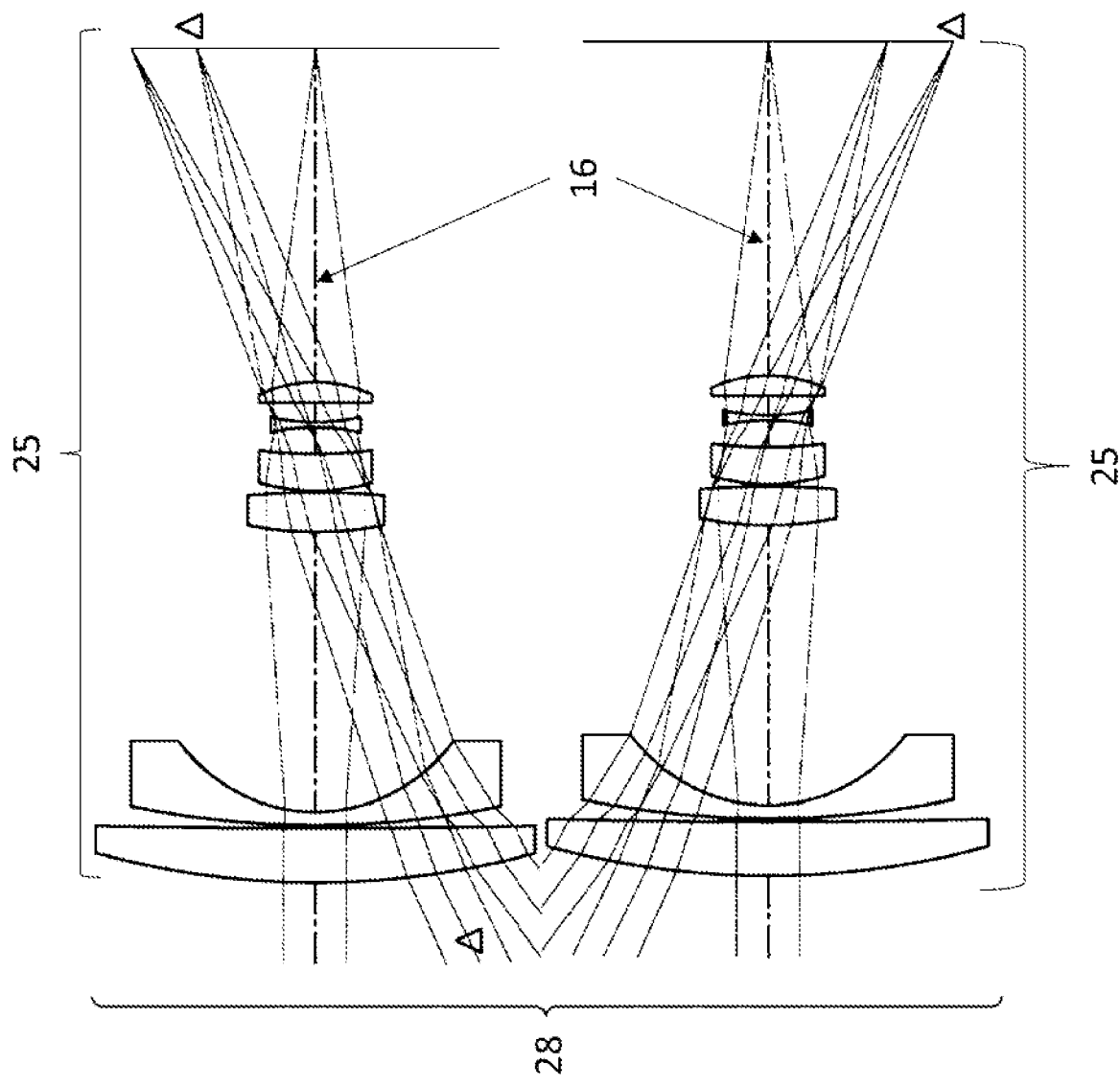
FIG. 5 illustrates how parallax occurs in the cameras created today. The field of views overlaps and a triangle that appears at the edge of the FOV for the bottom lens system will appear at around 0.707 times the FOV in the imaging system on top. Thus, the triangle is mapped to different image points for each camera. On bottom it is mapped to the full FOV (the edge of the image).

An aspect of the invention is a multicamera panoramic imaging system having no parallax. According to a non-limiting embodiment, the multicamera panoramic imaging system includes a plurality of discrete, imaging systems disposed in a side-by-side array, wherein a field of view of each discrete, imaging system is conjoined with a field of view of each adjacent discrete imaging system, further wherein a stencil of chief rays at the edge of the field of view of any one of the discrete imaging systems will be substantially parallel to a stencil of chief rays at the edge of the field of view of any adjacent ones of the discrete imaging systems such that all of the substantially parallel stencils of chief rays appear to converge to a common point when viewed from object space. In various non-limiting embodiments, the multicamera panoramic imaging system may include or be further characterized by the following features, limitations, characteristics either alone or in various combinations thereof:

comprising a plurality of identical discrete imaging systems;

wherein at least 50% of the stencil of chief rays deviate from parallel by twenty degrees or less;

wherein each of the discrete imaging systems includes an image sensor, further wherein the apparent convergence point lies behind the image sensor of each of the discrete imaging systems;

wherein none of the discrete imaging systems physically overlap;

wherein the system has a dodecahedron geometry, further wherein the system is characterized by a 360 degree FOV;

wherein a front lens of each of the discrete imaging systems is a portion of a single, contiguous freeform optic;

wherein each image sensor is a wavefront sensor;

wherein each of the discrete imaging systems has a curved image plane so as to match a distortion and Petzval Curvature of the imaging system.

An aspect of the invention is a method for forming an image of an object having no parallax. According to a non-limiting embodiment, the method includes providing a panoramic imaging system, wherein the panoramic imaging system comprises a plurality of discrete imaging systems each characterized by a field of view; and constraining a stencil of chief rays at the edge of the field of view of every one of the discrete imaging systems to be substantially parallel to a stencil of chief rays at the edge of the field of view of an immediately adjacent one of the discrete imaging systems such that all of the parallel stencils of chief rays appear to converge to a common point when viewed from object space, wherein the imaging system is parallax-free. In various non-limiting embodiments, the panoramic imaging method may include or be further characterized by the following features, limitations, characteristics, steps either alone or in various combinations thereof:

further comprising constraining at least 50% of the stencil of chief rays to deviate from parallel by twenty degrees or less;

further comprising using an algorithm to correct a distortion aberration in a contiguous 360 degree image formed by the imaging system.

An aspect of the invention is a method for designing a (substantially) parallax-free, panoramic imaging system. According to a non-limiting embodiment, the method includes determining an overall panoramic imaging system geometry, wherein the overall panoramic imaging system comprises a plurality of discrete, imaging systems having respective fields of view, disposed in a side-by-side array such that the fields of view of adjacent imaging systems conjoin; designing the discrete imaging systems such that a stencil of chief rays at the edge of the field of view of one of the discrete imaging systems will be substantially parallel to a stencil of chief rays at the edge of the field of view of an adjacent one of the discrete imaging systems such that the substantially parallel stencil of chief rays would appear to converge to a common point when viewed from object space. In various non-limiting embodiments, the panoramic imaging method may include or be further characterized by the following features, limitations, characteristics, steps either alone or in various combinations thereof:

wherein the overall panoramic imaging system comprises a plurality of identical discrete imaging systems;

wherein in designing the discrete imaging systems, ensuring that there is no physical overlap between any of the plurality of the discrete imaging systems;

wherein in designing the discrete imaging systems, ensuring that the apparent convergence point lies behind a respective image sensor of each discrete imaging system.

DETAILED DESCRIPTION OF EXEMPLARY, NON-LIMITING EMBODIMENTS

For a panoramic camera to achieve minimal parallax, the field of views (FOV) of the imaging systems must not overlap. Thus, the chief ray at the edge of the FOV must approach the optical system parallel to the chief rays at the edge of the adjacent optical system.

Figure 6:
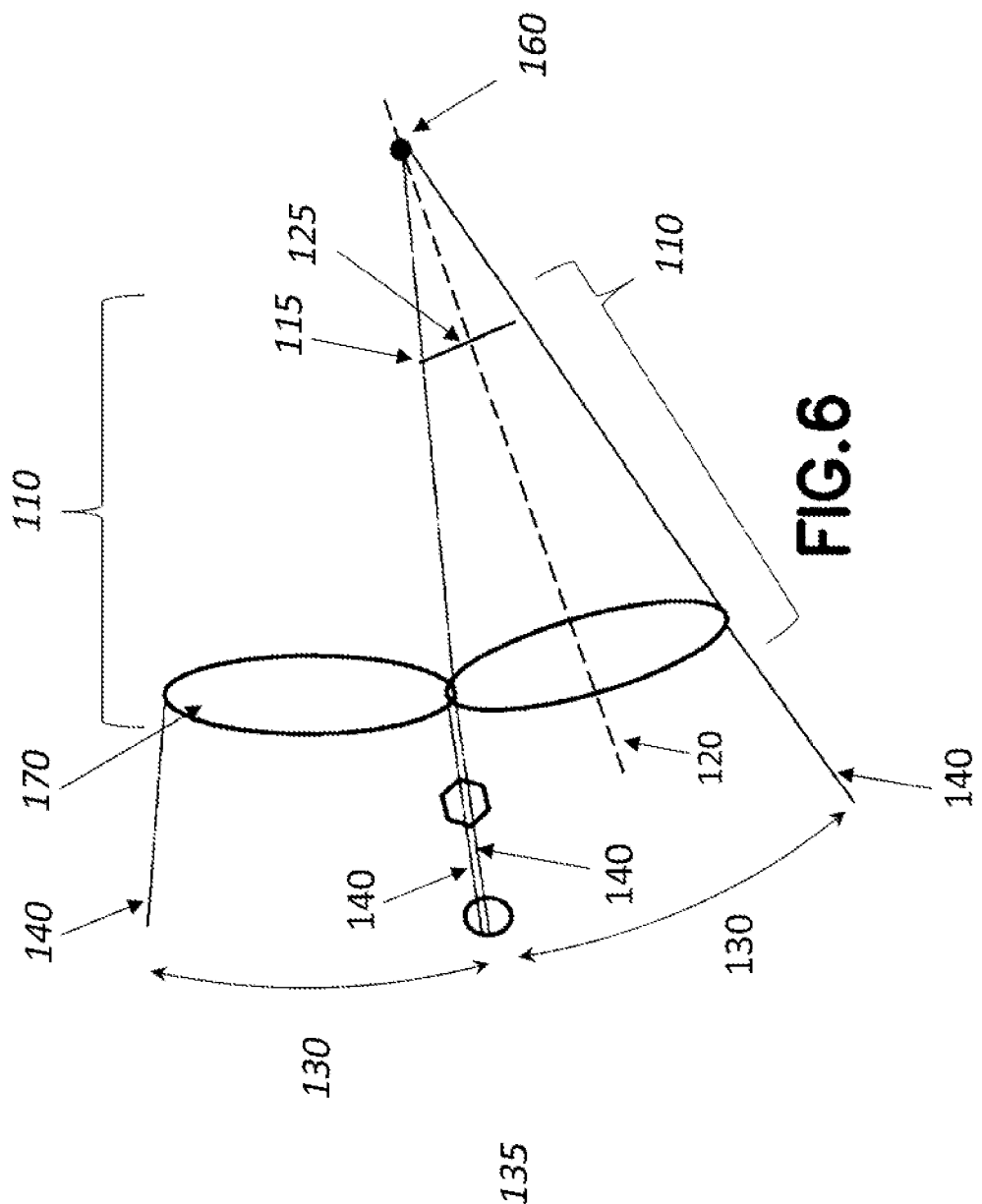
FIG. 6 illustrates two imaging systems side by side which do not have parallax. The chief rays at the edge of each system are constrained to lie parallel one another. Thus, objects lying along this line are imaged to the same point in the image plane.

FIG. 6 illustrates two imaging systems 110 side by side which do not have parallax. The chief rays 140 at the edge of each system are constrained to lie parallel one another. Thus, objects lying along this line are imaged to the same point in the image plane 115. This is an approach that can be used to design the individual lens elements. The fields of view 130 do not overlap one another because the chief rays 140 at the blending angles are constrained to be parallel to one another and converge to a common point 160. The common point 160 will depend on the geometry in which the lenses 110 are encased. In other words, the chief rays 140 are constrained to be parallel such that they appear to cross the optical axis 120 at the same point when viewing the lens system 110 from object space 135. In actuality, they cross the optical axis 120 at an image sensor 125, which lies before this imaginary point, but it appears, looking into the lens system 110 from object space 135, that they cross at the same point.

NP Point (No Parallax Point)

To aid in the understanding of the previous concept, we define a term referred to as the No Parallax Point (NP Point). The NP Point 160 is an abstraction used for understanding how the chief rays 140 at the edge of the FOV 130 can physically be made to lie parallel to one another and what rules they should follow. The NP Point 160 is the point where the chief rays 140 at the edge of adjacent optical systems 110 intersect the optical axis when viewing the system from object space 135 for a panoramic imaging system 100 without parallax.

Figure 9:
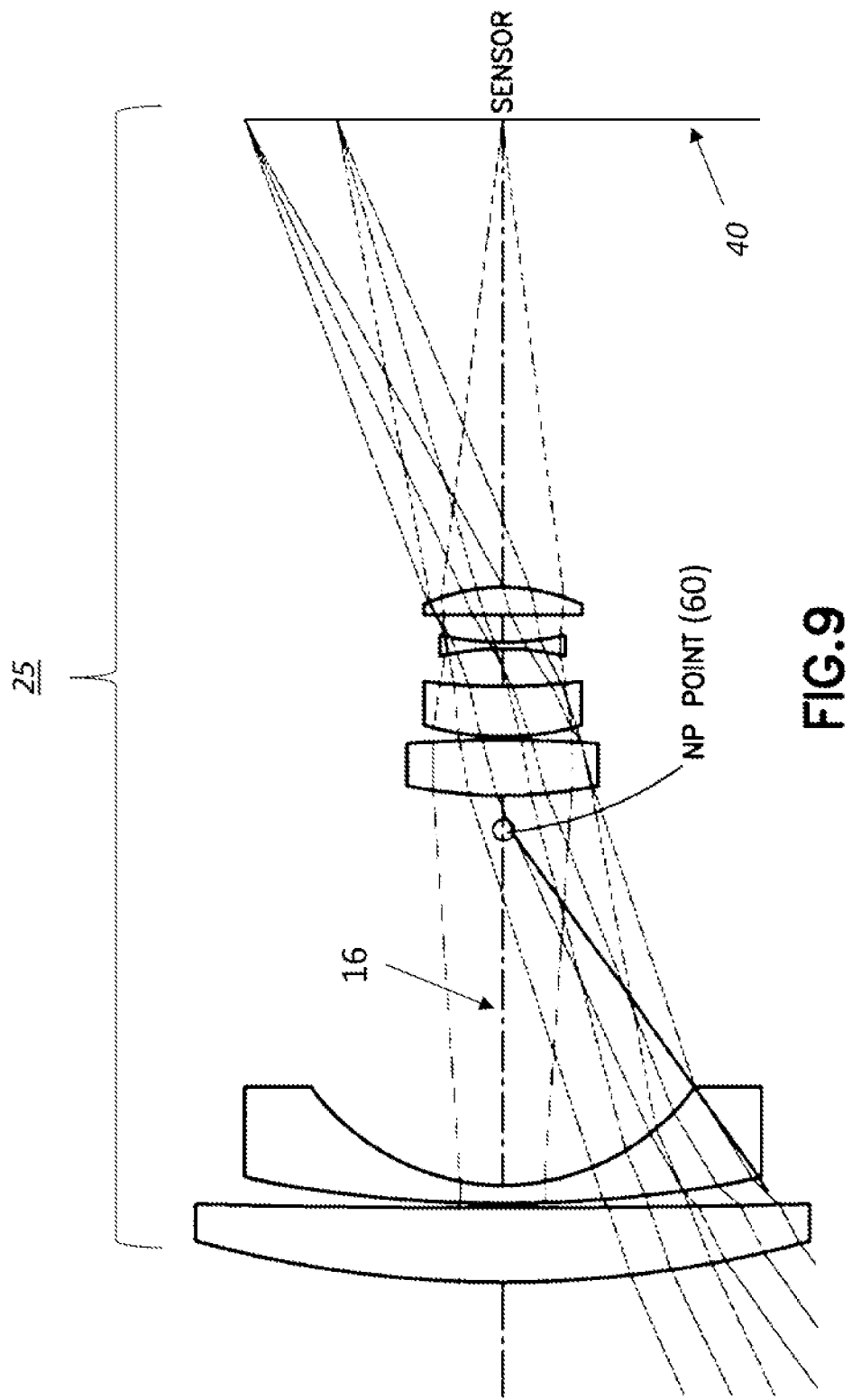
FIG. 9 illustrates an imaging system with NP Point lying before image sensor.
Figure 10:
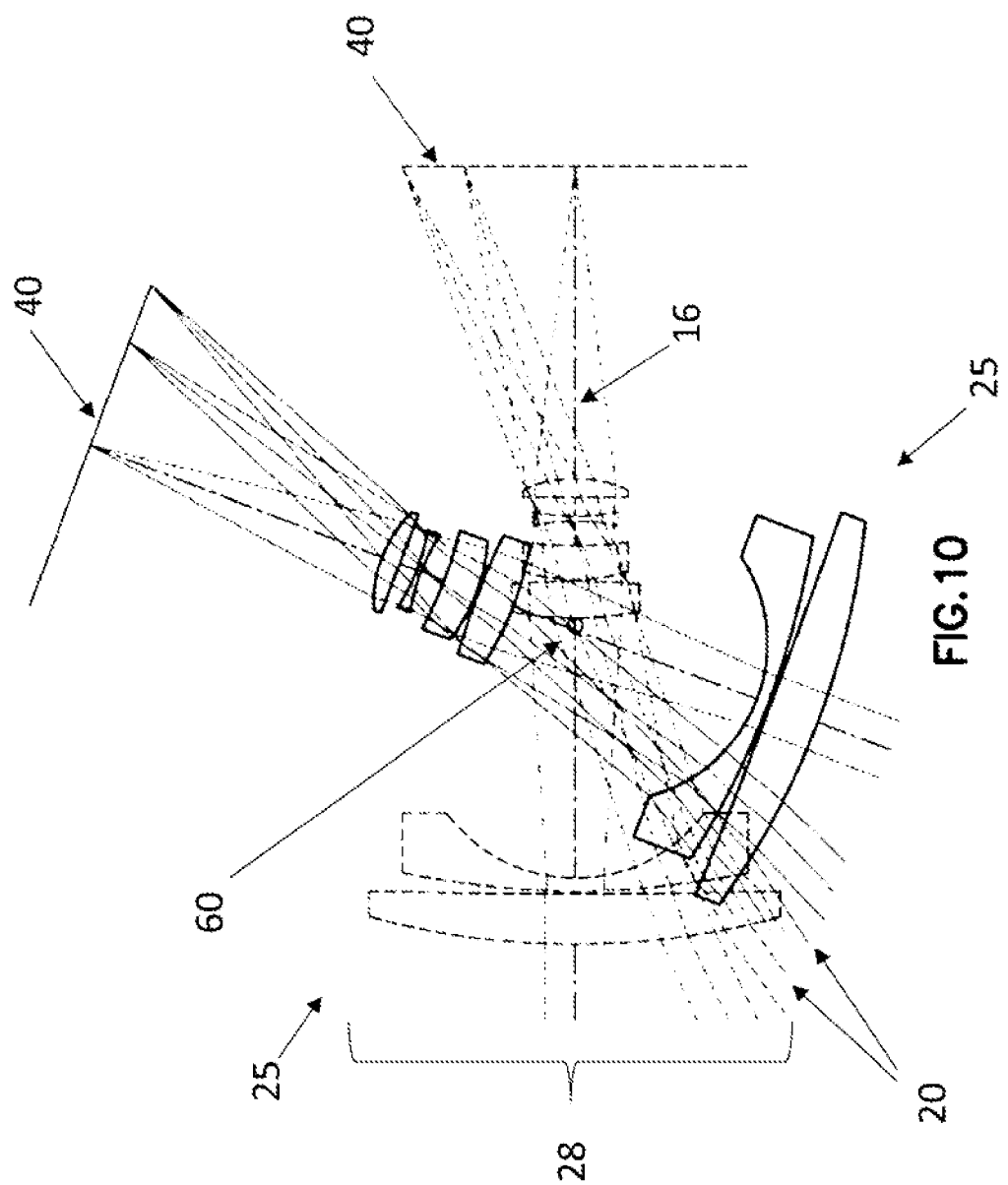
FIG. 10 illustrates two imaging systems aligned such that the chief rays at the edge of each ones FOV is parallel to the other.

According to the embodied invention, the NP Points for each imaging system must lie in the same location. That is to say, that the rays of adjacent optical systems must be parallel. FIG. 9 shows an imaging system 25 with the NP Point 60 lying in front of the imaging sensor 40. FIG. 10 illustrates two imaging systems 25 aligned such that the chief rays 20 at the edge of each one's FOV 28 is parallel to the other. This constraint means that the NP Point 60 must be at the same location for both systems. When the NP Point 60 is in front of the image sensor 40, it is impossible to align the NP Points 60 without the lens elements overlapping. This system would not have any parallax, but it is physically impossible to implement. This indicates that when designing the optical system, the NP Point should lie behind all of the elements in the imaging system so that no elements physically overlap with one another.

Figure 11:
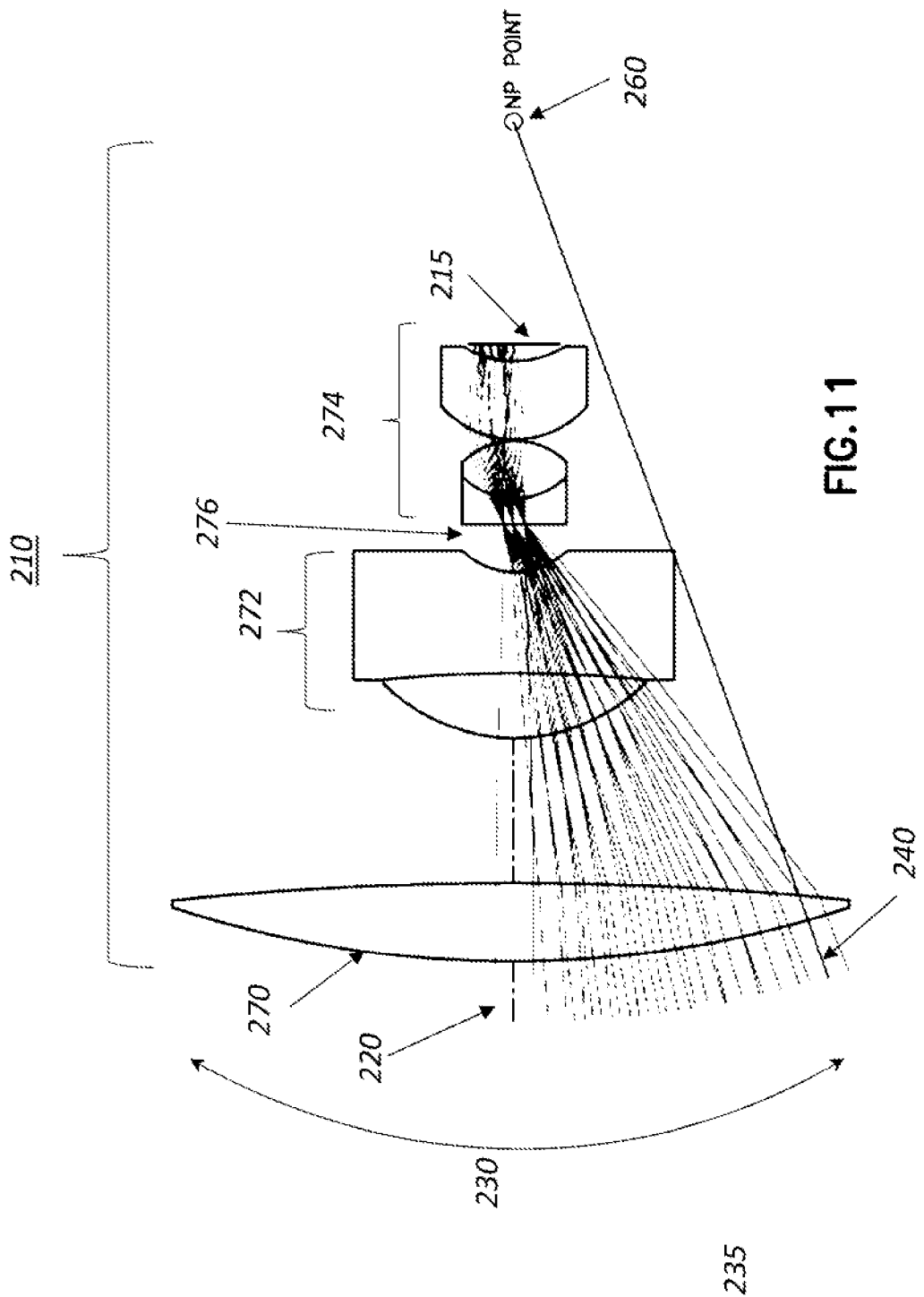
FIG. 11 shows an imaging system with NP Point behind the image plane.
Figure 12:
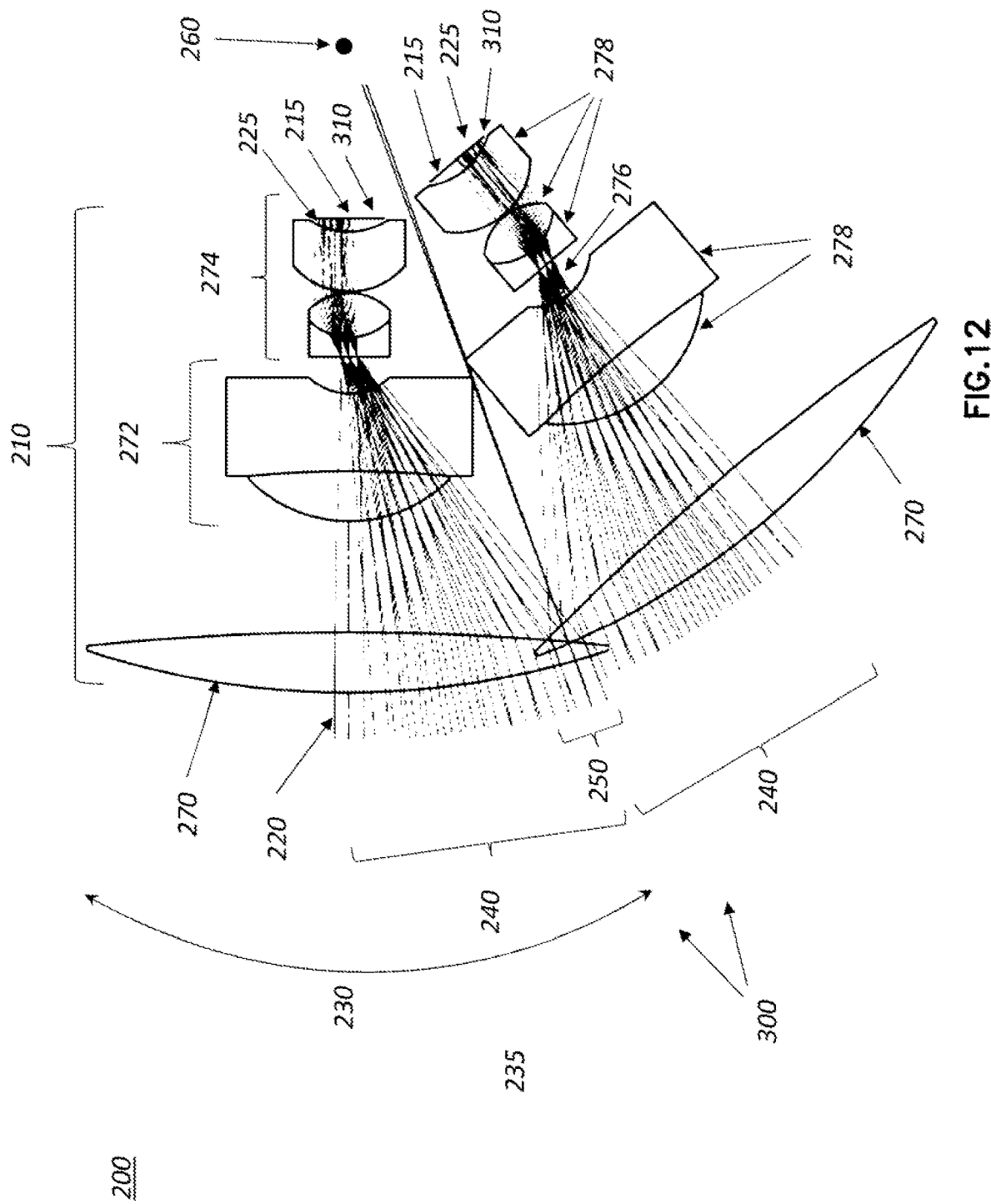
FIG. 12 shows a multiple unit imaging system with NP Points co-located.

FIG. 11 shows a system 210 where the NP Point 260 lies behind the image plane 215. When this is the case, it is possible to arrange multiple imaging systems 210 such that the fields of view 230 do not overlap, as shown in FIG. 12. The exact location of the NP Point 260 will be determined by the geometry of the lens arrangements. By arbitrarily picking a location, that is to say arbitrarily choosing a ray height and incident angle such that the chief ray 240 appears to cross the optical axis 220 behind the image plane 215, the geometry of lens systems may require hundreds of lens units to capture a full 360 degree image. The NP Point location must be determined after considering the geometry one may wish to use for the lenses (210).

Figure 7:
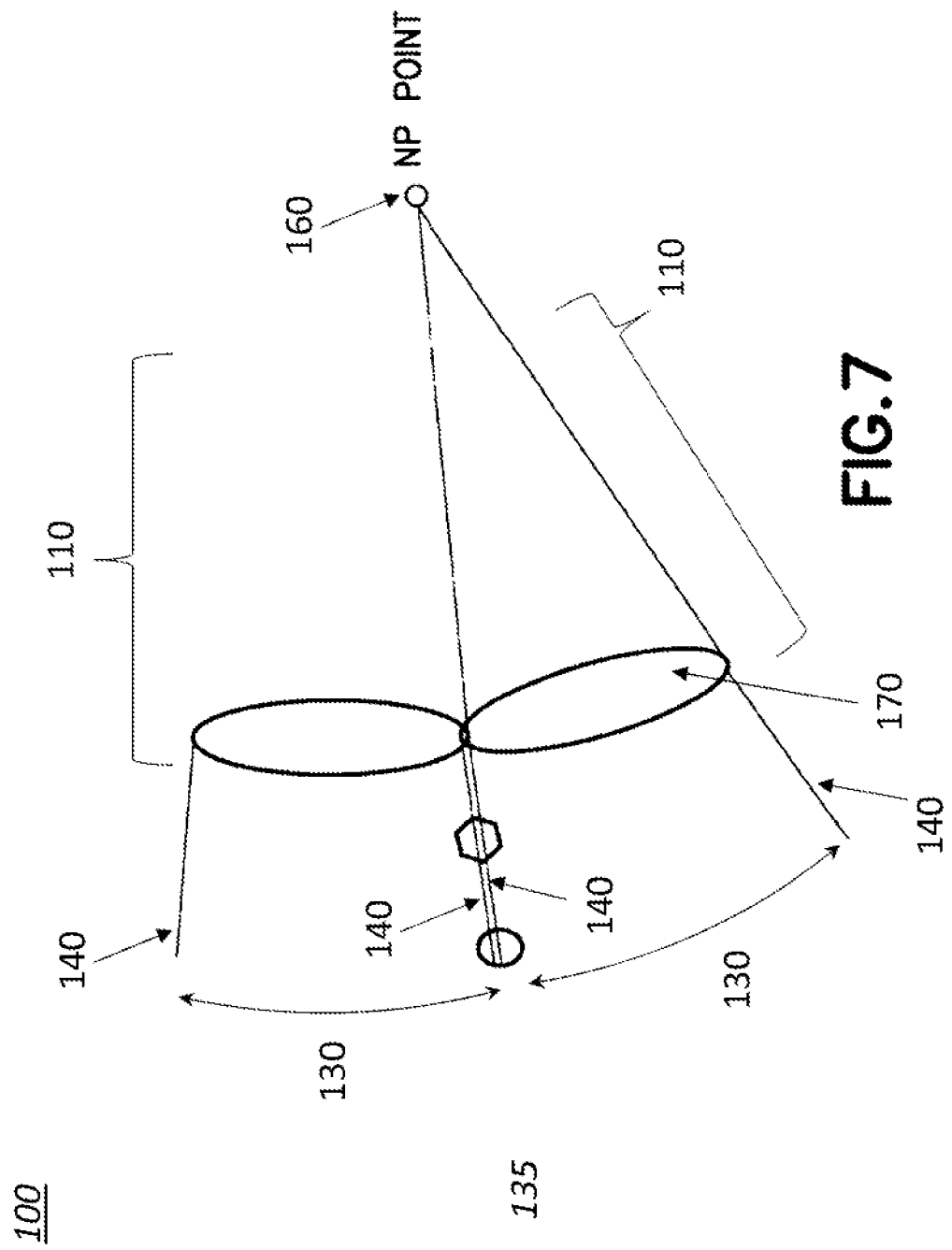
FIG. 7 illustrates the location of the non-parallax (NP) Point (as defined below) for both imaging systems shown.
Figure 8:
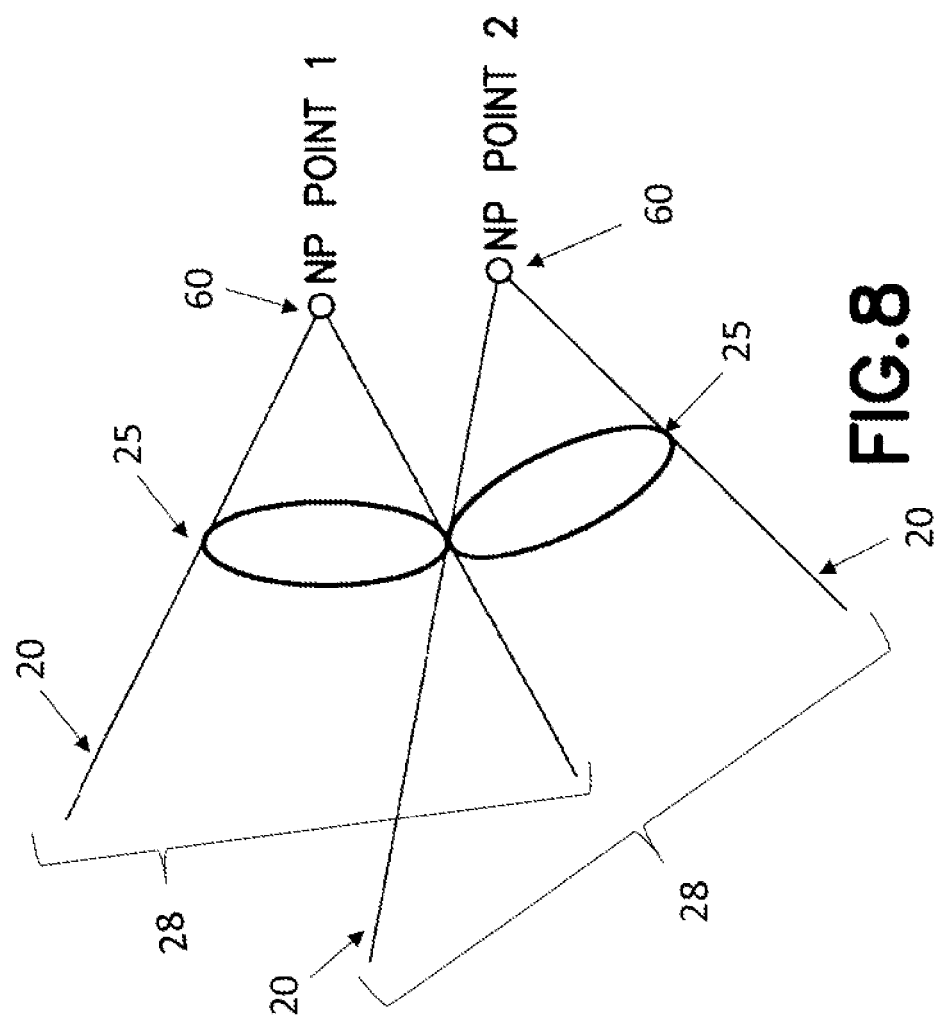
FIG. 8 shows that the chief rays 20 at the edge of the FOV 28 are not parallel, thus the NP Points 60 lie in different locations.

An embodiment of the present invention relates to a multicamera panoramic imaging system 100, where the fields of adjacent imaging units 110 merge to form the composite field of view of the entire imaging system, as illustrated in the schematic of FIG. 7. Traditional panoramic imaging systems 50 put together imaging units 25 in such a way that their respective fields of view 28 overlap as illustrated in the schematic of FIG. 8, which leads to parallax in the resulting images, and requires corrective software to stitch the images together to remove the parallax.

Figure 13:
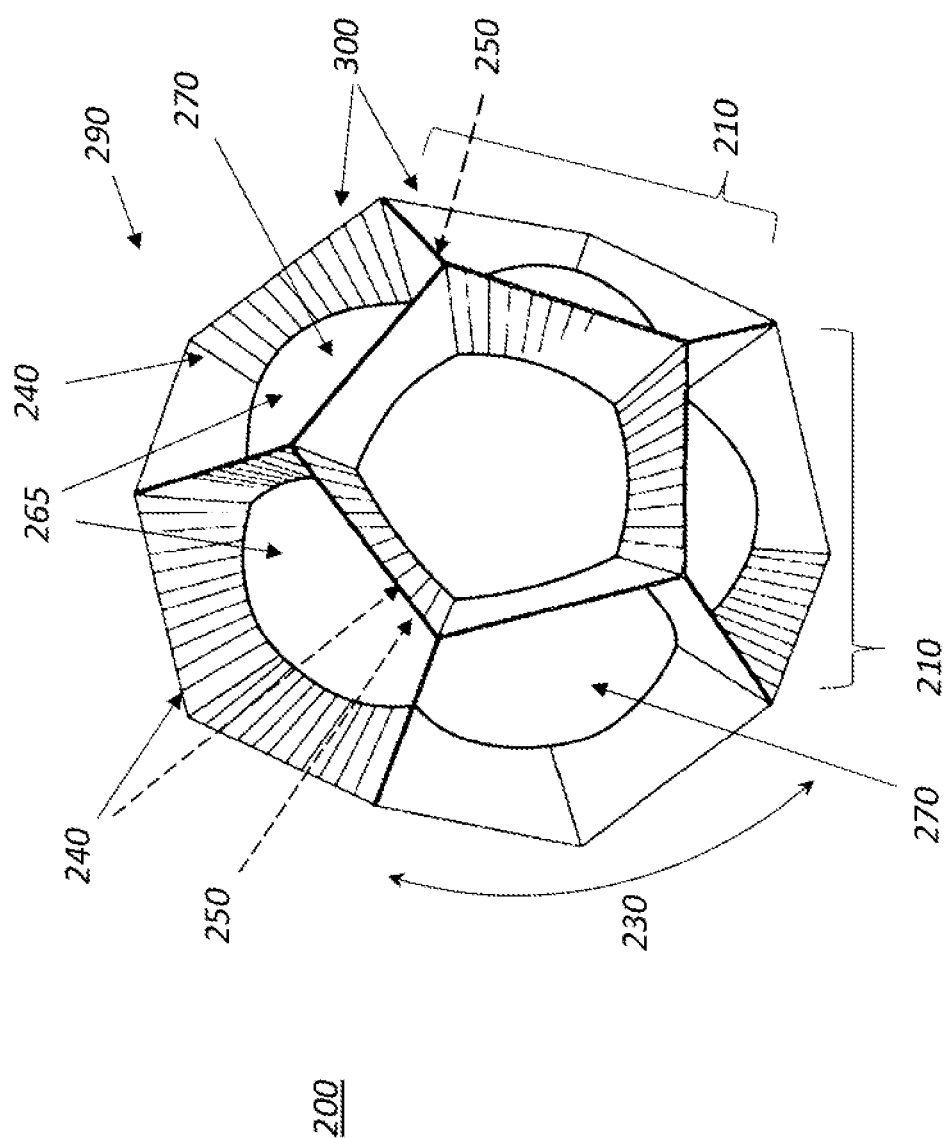
FIG. 13 shows a 3-dimensional representation of a 360 degree lens system with edge rays constrained to lie along each dodecahedron face.

In the instant exemplary embodiment, the rays striking the edge of one imaging unit are constrained to lie parallel to the incoming rays of an adjacent imaging unit so that both imaging systems share the same set of edge rays. As seen in the 3-dimensional model of FIG. 13, the rays 240 at the edge 250 of one imaging unit 210 are the same as those at the edge 250 of an adjacent imaging unit 210. The rays are the gray lines constrained to lie along the surface of the dodecahedron edge. The gray rays at the edge of each pentagon shaped lens 265 are coincident to the rays entering its neighboring surface. All rays at radii beneath the edge rays lie at smaller angles of incidence so that these rays do not overlap rays from adjacent systems 300.

The embodied panoramic imaging system 200 utilizes the aforementioned technique of designing an imaging system with a NP point 260 behind the image sensor (225), and combines multiple lens systems (210) in a dodecahedron geometry, to create a 360 degree FOV camera (200) with minimal or no parallax.

The first lens element 270 will be shaped into the surface of a regular pentagon 267. The complete system will be composed of 12 discrete imaging units 210, each with a common NP point 260 for rays along the edge of the pentagon 267 and constrained to have incident angles meeting the geometry specified by that of a dodecahedron.

A dodecahedron is a polyhedron with 12 surfaces. A polyhedron is a three dimensional solid consisting of a collection of polygons joined at the edges. Each side of the dodecahedron is a regular pentagon (a pentagon with equal length sides). Dodecahedrons have some important geometrical properties that must be understood in order to design a lens system 210 utilizing the geometry. The properties will be discussed in turn next after briefly discussing why the first lens must be shaped into the surface of a pentagon.

Figure 14:
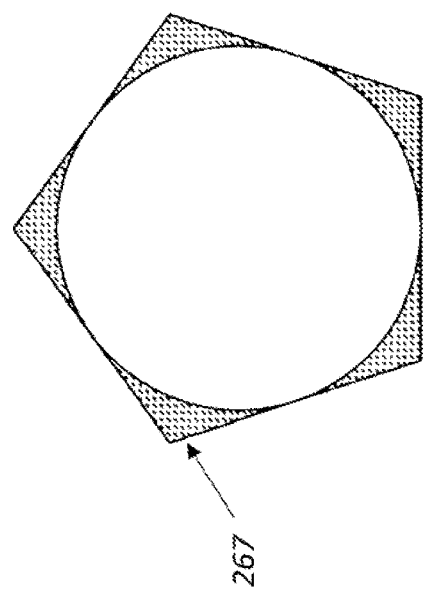
FIG. 14 shows a circle inscribed in a pentagon illustrating blind spots that would be created if lens was a circle rather than a pentagon.

By using a circularly edged lens as the first element 270 in the dodecahedron geometry, it is not possible to capture all information in the 360 degree field of view using the current technique of aligning edge rays. The missing area from where the first lens 270 is inscribed in the pentagon 267 (shaded region in FIG. 14) creates blind spots. Because the fields of view 230 never overlap, this information is never captured. It can be calculated that the ratio between the area of a circle to the area of a pentagon 267 it is inscribed in is equal to $\pi/5$ or 62.83%. This is the maximal amount of information that we can record for the 360 degree field around us. Blind spots created between the lens and the pentagon delete nearly 40% of information in the 360 degree image.

The following description is meant to illustrate the geometry of a dodecahedron and is necessary when creating a lens system 210 utilizing the aforementioned NP technique and a dodecahedron geometry, but is not essential for the purposes of creating the no parallax, panoramic imaging system 200 embodied herein.

Property 1: Diameter of Circle Circumscribing Regular Pentagon

Figure 15:
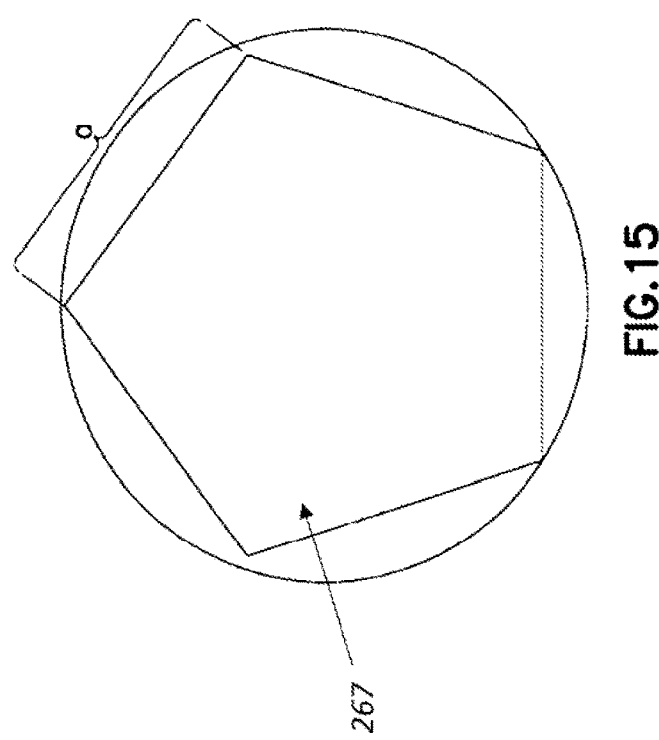
FIG. 15 shows the first lens element of each system, initially designed to circumscribe regular pentagons.

For each of the 12 individual lens systems 210, the first lens 270 will be designed such that it circumscribes each of the regular pentagons 267 of the dodecahedron as shown in FIG. 15. The diameter of a circle circumscribing a regular pentagon is:

$$D = a/\sin(36°) = 1.7013a$$

Figure 16:
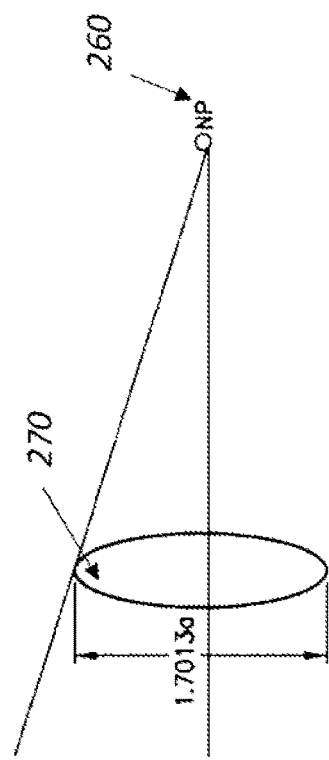
FIG. 16: The diameter of the first lens element is constrained to be 1.7013a, where a is the side length of the regular pentagon.

In the equation above, "a" is the side length of the regular pentagon. The first lens element 270 of each system (210) will fully circumscribe each pentagon 267 and so the diameter of the first lens element 270 for each system (210) is given as 1.7013a as illustrated in FIG. 16.

Property 2: Inscribed Sphere Touching Center of Each Pentagon

The radius of an inscribed sphere (tangent to each of the dodecahedron's faces) is:

$$r_i = a\frac{1}{2}\sqrt{\frac{5}{2} + \frac{11}{10}\sqrt{5}} \approx 1.113516364 \cdot a$$

Figure 17:
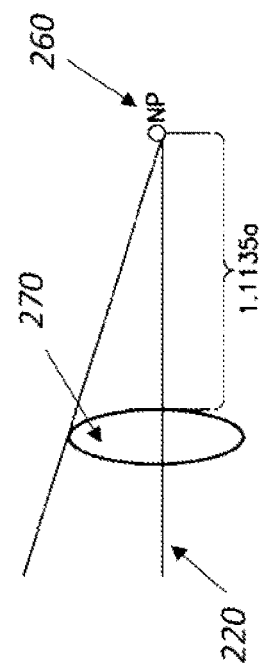
FIG. 17: The distance from the center of the first lens element to the center of the dodecahedron (NP Point) is 1.1135a where a is the side length of the pentagon.

This radius is the distance from the center 280 of the dodecahedron, which will be the NP Point 260 for each lens (210) in this design, and the center of the pentagon's face, which coincides with the center (optical axis) of the first lens element 270 in a system occupying that pentagon. This point is at the center of each pentagon face. The length between the NP point 260 and the center of the dodecahedron is constrained to be 1.1135a where a is the length of one of the pentagon sides, as illustrated in FIG. 17.

Property 3: Mid-Radius of Dodecahedron

The mid-radius is the point connecting the center of the dodecahedron and the middle of each edge. This length is given as follows:

$$r_m = a\frac{1}{4}(3 + \sqrt{5}) \approx 1.309016994 \cdot a$$

Figure 18:
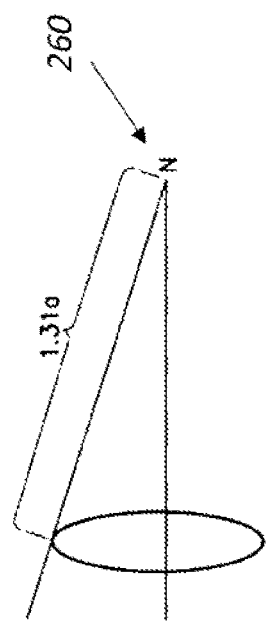
FIG. 18: The distance from the top of the pentagon face to the NP Point is constrained to be 1.31a where a is the side length of the regular pentagon. Here the NP Point is the center of the dodecahedron.

This equation constrains the distance between the top of the pentagon face and the NP Point, as illustrated in FIG. 18.

Constraints

The geometric properties of a dodecahedron constrain the design of the 12 lenses (210) that will embody it. In particular, we have the following four parameters based upon the description given above:
 1. Diameter of 1st lens element 270: 1.7013a;
 2. Distance from 1st lens element 270 to center of dodecahedron: 1.1135a;
 3. Distance from top of 1st lens element 270 to center of dodecahedron: 1.31a;
 4. FOV=37.3777 degrees Given any two of the first three constraints, we have that the angle between the optical axis 220 of the lens (210) and the top of the first lens element 270 is 37.3777 degrees (see FIG. 19):

$$\tan^{-1}((1.7013/2)/1.1135) - 37.377°$$

We want this angle of 37.37 degrees to be the field of view 230 of the lens (210). This will ensure that the NP Point 260, that is the point where the chief ray 240 of the blending (the blending angle being the full FOV) intersects the optical axis 220 in object space 235, lies at the center 280 of the dodecahedron. All of the other constraints will ensure that the lens elements 278 lie before the NP Point 260 and that the elements 278 fall within the 31.717 degree half angle cone of light.

Diameter of Other Lens Elements and Sensor

With the four constraints given above, we know what the size of each lens element 278 after the first (270) must be in order to fit into the dodecahedron geometry. In order for the preceding lens elements (278) to fit, any lens or sensor element must fit inside of the 31.717 degree cone of light beginning at the center of the dodecahedron and tangential to the diameter of the first lens element 270. As the distance from the first lens element 270 increases, the diameter of the preceding lens elements 278 will decrease proportionally (see FIG. 20).

The maximum diameter of any lens element 278 or sensor (225) preceding the first can be found geometrically to be less than or equal to (1.1135a–D)*tan(31.716 degrees) where D is the distance of that element from the first lens element 270.

Thus, we now have the five constraints that will allow this lens system 210 to match the geometry of a dodecahedron and permit 360 degree imaging:
 1. Diameter of 1st lens element 270: 1.3763a;
 2. Distance from 1st lens element 270 to center of dodecahedron: 1.1135a;
 3. Distance from top of 1st lens element 270 to center of dodecahedron: 1.31a;
 4. FOV=37.377 degrees;
 5. $\varphi_{Li} < (1.1135a - D_{L1,Li})\tan(31.717°)$, where $\varphi_{Li}$ is the diameter of any lens element separated by a distance $D_{L1, Li}$ from the first. Given the above five constraints, where all lenses are designed such that they fall within the 31.717 degree cone of light emanating from the center 280 of the dodecahedron, it is possible to construct a lens system 210 without parallax.

System Design

A geometry for the lenses (210) was chosen. Platonic solids have the property that they are composed of many solids of equal geometry and volume. For a system imaging 360 degrees, this allows the composite imaging system to be made from the same replicated lens design. A dodecahedron geometry was chosen because it is approximately spherical in its geometry.

Figure 21:
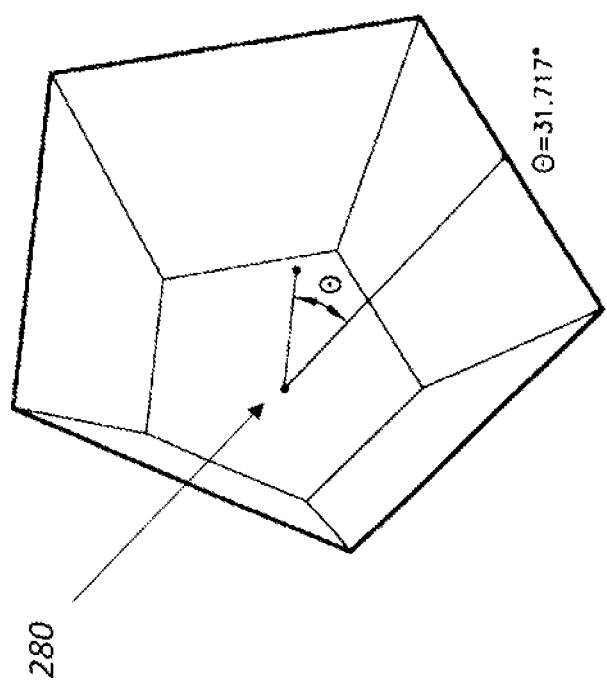
FIG. 21: Three-dimensional representation of $\frac{1}{12}$th of dodecahedron and angle between center of dodecahedron and center of pentagon edge.

In order for the edge rays of one imaging unit 210 to lie parallel to those of an adjacent unit, they must enter at the same angle. The angle shared by both imaging units is that of the dodecahedrons edge surface. At the center of the edge surface, the angle with respect to the center of the dodecahedron center is 31.717 degrees, as illustrated in FIG. 21. At the corner of the edge surface, the angle with respect to the center of the dodecahedron center 280 is 37.377 degrees, as illustrated in FIG. 22.

In order to make the rays along adjacent imaging units 210 match, the first lens 270 of the imaging unit 210 is cut into a pentagon 267, matching the surface of the dodecahedron. At the center of the edge, the ray 240 striking the surface enters with an angle of incidence of 31.717 degrees. At the corner of the edge, the angle of incidence of an entering ray is 37.377 degrees. At all points along the edge of the lens (270), the angle of incidence of an entering ray is made to match the geometry of the dodecahedron surface.

Figure 22:
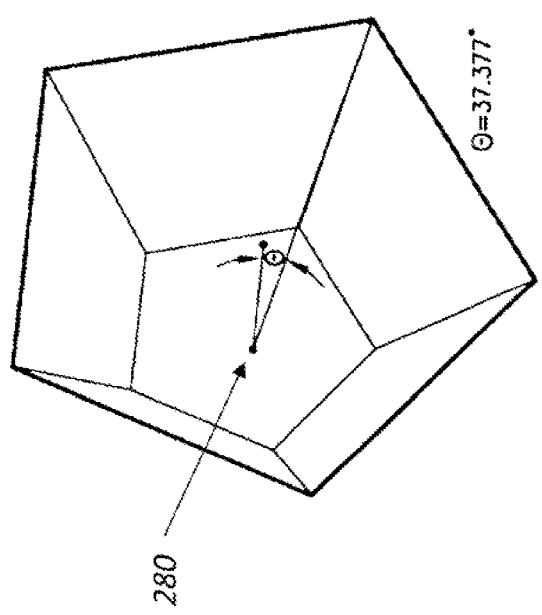
FIG. 22: Three-dimensional representation of $\frac{1}{12}$th of dodecahedron and angle between center of dodecahedron and edge of pentagon edge.
Figure 23:
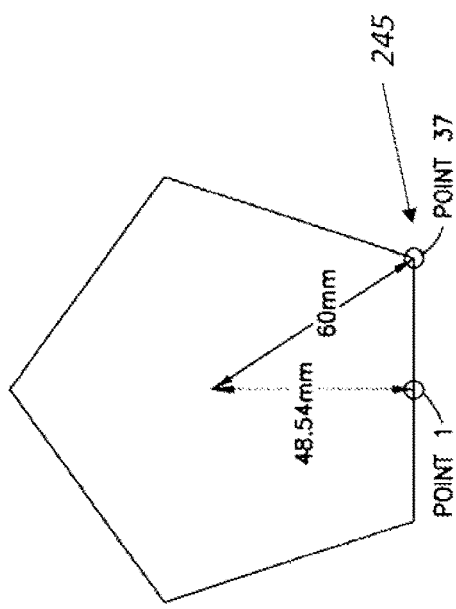
FIG. 23: Pentagon shaped lens element showing height to ray 1 and ray 37.

The angle of incidence for 37 rays along the edge of the pentagon lens was calculated using trigonometry, knowing the distance from the center of the dodecahedron to the center of the pentagon face, and knowing the distance from the center 280 of the dodecahedron to the edge point in question as shown in the FIGS. 21 and 22. The height of each ray was constrained to lie along the pentagon edge. For example, with a radius of 120 mm describing the circumscribed circle of surface 1, the ray at point 1 has a height of 48.54 mm and an angle of incidence of 31.717 degrees. The ray at point 37 has a height of 60 mm and an angle of incidence of 37.377 degrees. Table I describes the values for ray heights and angle of incidence for 37 points between Point 1 and Point 36 in FIG. 23.

TABLE I (Data showing constraints on 37 rays 240 lying along the edge of the first lens 270)

| Point | Ray Height 245 | Angle of Incidence |
|---|---|---|
| 1 | −48.54101966 | 31.71747441 |
| 2 | −48.55131914 | 31.72137741 |
| 3 | −48.58220446 | 31.7330904 |
| 4 | −48.6336364 | 31.75262531 |
| 5 | −48.70554989 | 31.78000204 |
| 6 | −48.79785436 | 31.81524851 |
| 7 | −48.91043437 | 31.8584007 |
| 8 | −49.04315028 | 31.90950275 |
| 9 | −49.19583915 | 31.96860698 |
| 10 | −49.36831565 | 32.03577404 |
| 11 | −49.56037318 | 32.111073 |
| 12 | −49.77178508 | 32.19458149 |
| 13 | −50.00230585 | 32.28638584 |
| 14 | −50.25167251 | 32.38658121 |
| 15 | −50.51960599 | 32.49527181 |
| 16 | −50.80581256 | 32.61257109 |
| 17 | −51.10998523 | 32.7386019 |
| 18 | −51.43180524 | 32.87349676 |
| 19 | −51.77094349 | 33.01739809 |
| 20 | −52.12706197 | 33.17045845 |
| 21 | −52.49981514 | 33.33284086 |
| 22 | −52.88885128 | 33.50471903 |
| 23 | −53.2938138 | 33.68627773 |
| 24 | −53.7143425 | 33.87771306 |
| 25 | −54.1500747 | 34.07923284 |
| 26 | −54.60064642 | 34.29105695 |
| 27 | −55.0656934 | 34.51341771 |
| 28 | −55.54485206 | 34.74656026 |
| 29 | −56.03776039 | 34.99074298 |
| 30 | −56.54405884 | 35.2462379 |

TABLE I-continued (Data showing constraints on 37 rays 240 lying along the edge of the first lens 270)

| Point | Ray Height 245 | Angle of Incidence |
|---|---|---|
| 31 | −57.06339098 | 35.51333115 |
| 32 | −57.59540424 | 35.7923234 |
| 33 | −58.13975051 | 36.0835303 |
| 34 | −58.69608667 | 36.38728295 |
| 35 | −59.26407504 | 36.70392839 |
| 36 | −59.84338384 | 37.03383003 |
| 37 | −60 | 37.37736813 |

Figure 24:
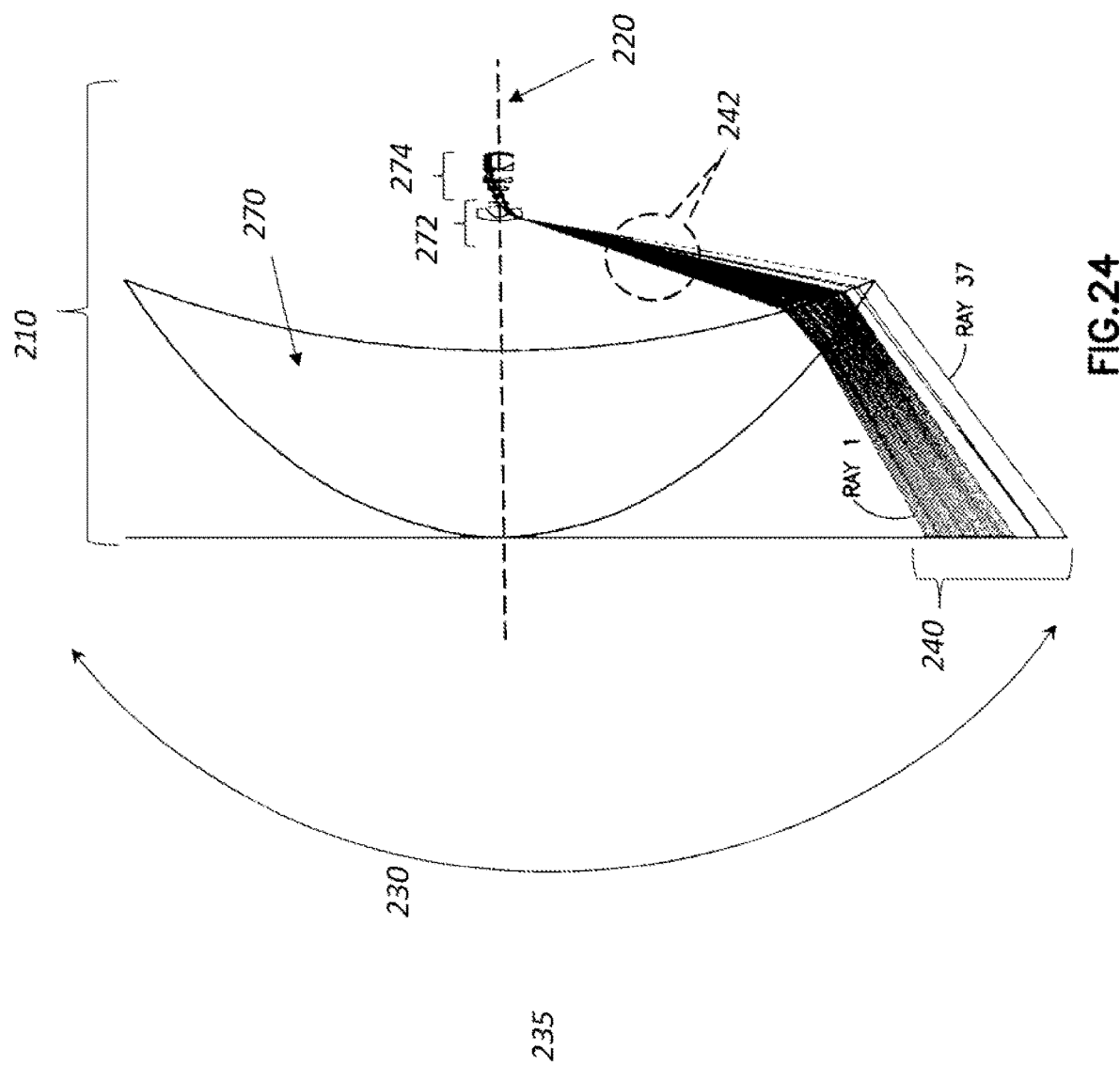
FIG. 24: Zemax diagram of current lens design showing Rays 1 and 37 in model.
Figure 25:
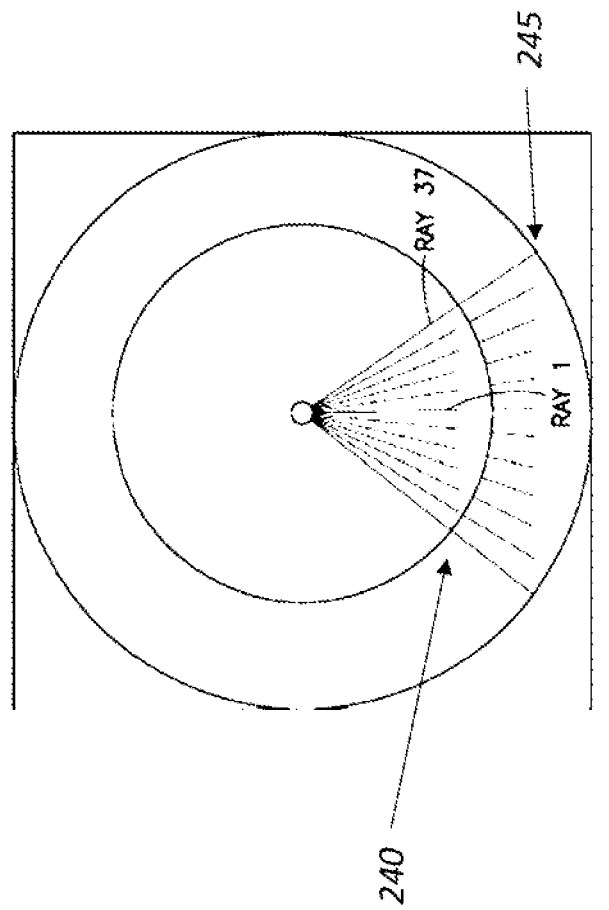
FIG. 25: Three-dimensional Zemax diagram of current lens design from back.
Figure 26:
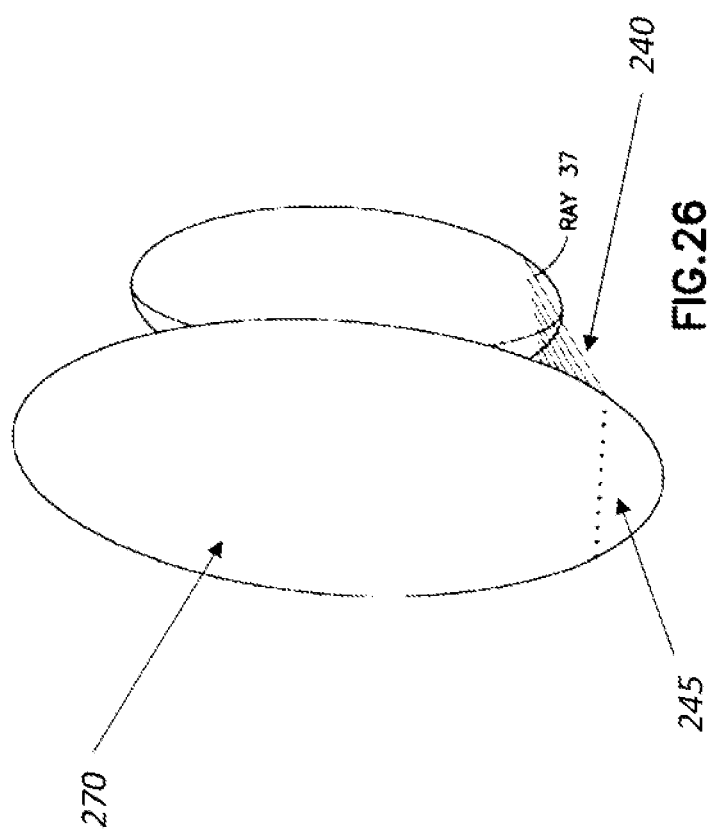
FIG. 26: Three-dimensional Zemax diagram from side.

A diagram illustrating the ray constraints is shown in FIG. 24. Ray 1 has a height of 48.54 mm and an angle of incidence of 31.717 degrees. Ray 1 is the ray going through point 1 in FIG. 24. Ray 2 has a height of 60 mm and an angle of incidence of 37.377 degrees and is the ray going through point 37 in FIG. 24. All 37 rays 240 are constrained by the ray heights 245 and angles specified in the table above. Constrained in this way, all rays 240 enter the lens 270 at the same angle as the surface of the dodecahedron. Looking at those same rays in another way, we can see that the rays are constrained properly to a pentagon geometry at the correct angles of incidence, as illustrated in FIGS. 25 and 26.

PARTS LIST

10 optical system
12 object
14 image
16 optical axis
18 aperture stop
20 chief ray
25 imaging system, optical system, camera, imaging unit
28 field of view (FOV)
35 object space
40 imaging sensor, image sensor
50 360 degree imaging system, panoramic imaging system
60 NP point
100 panoramic imaging system
110 imaging system, lenses, lens system, imaging unit
115 image plane
120 optical axis
125 image sensor
130 field of view, FOV
135 object space
160 NP point, common point
170 front lens
200 panoramic imaging system
210 discrete imaging system, imaging system, imaging unit, lens system
215 image plane
220 optical axis
225 image sensor
230 field of view, FOV
235 object space
240 ray, chief ray
242 refracted chief rays
245 ray heights
250 edge
260 NP point, common point
265 pentagon shaped lens
267 pentagon
270 front lens, first lens, first lens element, first element, 1st lens element 272 second lens group
274 third lens group
276 aperture stop
278 lens elements
280 center
290 dodecahedron
300 adjacent systems, side by side array
310 wavefront sensor

I claim:

1. An imaging system, comprising:
a first lens system that forms a first image at a first image plane, the first lens system having a first front lens with a plurality of first edges defining a first polygonal shape and having a first polygonal-shaped field of view, the first front lens configured to capture first incident light from object space to provide first image light, a subsequent second lens group for redirecting the first image light towards a first aperture stop, and a subsequent third lens group which receives the first image light from the first aperture stop and redirects it to form the first image on the first image plane;
a second lens system, adjacent to the first lens system, that forms a second image at a second image plane, the second imaging system having a second front lens with a plurality of second edges defining a second polygonal shape and having a second polygonal-shaped field of view, the second front lens configured to capture second incident light from object space to provide second image light, a subsequent second lens group for redirecting the second image light towards a second aperture stop, and a subsequent third lens group which receives the second image light from the second aperture stop and redirects it to form a second image on the second image plane;
a first edge of the plurality of first edges is adjacent a second edge of the plurality of second edges forming a common adjacent edge;
each of the first lens system and the second lens system is configured to constrain a first plurality of chief rays that are incident along the first edge and a second plurality of chief rays that are incident along the second edge of the common adjacent edge to be substantially parallel to each other along the common adjacent edge such that the first lens system and the second lens system share the first plurality of chief rays and the second plurality of chief rays striking along the common adjacent edge; and
a combined field of view of the first lens system and the second lens system is a sum of the first polygonal-shaped field of view and the second polygonal-shaped field of view.

2. The imaging system of claim 1, wherein the first lens system and the second lens system respectively form the first image and the second image with minimal or no parallax.

3. The imaging system of claim 1, wherein the first image and the second image formed by the first lens system and the second lens system have minimal or no parallax along the common adjacent edge.

4. The imaging system of claim 1, wherein the first plurality of chief rays and the second plurality of chief rays appear, when viewed from an object space, to converge towards a common NP point when viewed from the object space.

5. The imaging system of claim 4, further comprising:
a first image sensor associated with the first lens system and disposed between the first front lens and the common NP point; and
a second image sensor associated with the second lens system and disposed between the second front lens and the common NP point.

6. The imaging system of claim 1, wherein at least one of the first polygonal shape and the second polygonal shape is a pentagon.

7. The imaging system of claim 1, wherein at least one of the first incident light from within first polygonal-shaped field of view or the second incident light from within the second polygonal-shaped field of view has an angular half width that is from about 31-degrees wide to about 37-degrees wide.

8. The imaging system of claim 1, wherein the first lens system and the second lens system are configured in a side-by-side array that conforms to a portion of a three-dimensional geometric shape.

9. The imaging system of claim 8, wherein the three-dimensional geometric shape is a platonic solid.

10. The imaging system of claim 1, wherein the first polygonal-shaped field of view and the second polygonal-shaped field of view have minimal or no overlap along the common adjacent edge.

11. A multicamera panoramic imaging system having at least two adjacent camera lens systems, comprising:
a first camera lens system and a second camera lens system, each having a front lens with a polygonal-shaped field of view, the front lens having polygonal edges arranged along a polygonal shape, for capturing incident light from object space to provide image light, a subsequent second lens group for redirecting the image light towards an aperture stop, and a subsequent third lens group which receives the image light from the aperture stop and redirects it to form an image at an image plane;
the first camera lens system and the second camera lens system are arranged side by side to abut along a common adjacent polygonal edge; and
each of the first camera lens system and the second camera lens system is configured to constrain an associated plurality of chief rays that are incident along the common adjacent polygonal edge to appear to converge to a common NP point behind the image plane in each of the first camera lens system and the second camera lens system when viewed from object space.

12. The imaging system of claim 11, wherein the plurality of chief rays incident along the common adjacent polygonal edge are constrained to have angles of incidences that are substantially parallel to each other along the common adjacent polygonal edge.

13. The imaging system of claim 11, further comprising:
a first image sensor associated with the first camera lens system and disposed at the first image plane; and
a second image sensor associated with the second camera lens system and disposed at the second image plane.

14. The imaging system of claim 11, wherein the image formed, respectively, by the first camera lens system and the second camera lens system have minimal or no parallax along the common adjacent polygonal edge.

15. The imaging system of claim 11, wherein the first camera lens system and the second camera lens system share the plurality of chief rays that are incident along the common adjacent polygonal edge.

16. The imaging system of claim 11, wherein the incident light from object space within the polygonal-shaped field of view has an angular half width that is from about 31-degrees wide to about 37-degrees wide.

17. The imaging system of claim 11, wherein the polygonal-shaped field of view of the first camera lens system and the second camera lens system together form a combined field of view.

18. An imaging system, comprising:
a lens system that forms an image on an image sensor, the lens system having a first lens with a polygonal shape with at least one polygonal edge and a polygonal-shaped field of view;
a subsequent second lens group for redirecting image light from the first lens towards an aperture stop; and
a subsequent third lens group which receives the image light from the aperture stop and redirects it to form an image on the image sensor;
the first lens being configured to capture incident light from object space within the polygonal-shaped field of view that matches the polygonal shape of the first lens, and the first lens is configured to constrain a plurality of chief rays that are incident along the at least one polygonal edge to have angles of incidence that are substantially parallel to each other along a length of the at least one polygonal edge.

19. The imaging system of claim 18, wherein the polygonal shape of the first lens is that of a pentagon.

20. The imaging system of claim 18, wherein the plurality of chief rays incident along the at least one polygonal edge of the first lens are constrained to be substantially parallel to each other along a length of the at least one polygonal edge.

21. The imaging system of claim 18, wherein the plurality of chief rays incident along the at least one polygonal edge, when viewed from object space, appear to converge towards a common NP point located behind the image sensor.

* * * * *